(12) United States Patent  
Wang et al.

(10) Patent No.: US 7,835,631 B2
(45) Date of Patent: Nov. 16, 2010

(54) COMBINATION LIGHT AND A DEVICE FOR DISPENSING A VOLATILE SUBSTANCE

(75) Inventors: Wender Wang, Wilmington, MA (US); Stephen Shapiro, Arlington, MA (US)

(73) Assignee: The Schawbel Corporation, Bedford, MA (US)

( * ) Notice: Subject to any disclaimer, the term of this patent is extended or adjusted under 35 U.S.C. 154(b) by 119 days.

(21) Appl. No.: 12/129,502

(22) Filed: May 29, 2008

(65) Prior Publication Data

US 2009/0294553 A1    Dec. 3, 2009

(51) Int. Cl.
*E21B 7/15*       (2006.01)
*B05B 1/24*       (2006.01)

(52) U.S. Cl. ...................................... 392/303; 239/135
(58) Field of Classification Search ......... 392/301–306; 219/601; 239/135, 136–139; 432/94; 431/344
See application file for complete search history.

(56) References Cited

U.S. PATENT DOCUMENTS

2009/0294553 A1*  12/2009  Wang et al. .................. 239/135

* cited by examiner

*Primary Examiner*—Daniel Robinson
(74) *Attorney, Agent, or Firm*—Levisohn Berger LLP

(57) ABSTRACT

A combination lantern and insect repellent dispensing apparatus. Light is produced by light bulbs or LEDs whereas insect repellent is dispensed by heating a volatilizable insecticide. The insecticide and portable light may be used either concurrently or independently of each other.

15 Claims, 9 Drawing Sheets

COMBINATION LIGHT AND A DEVICE FOR DISPENSING A VOLATILE SUBSTANCE

BACKGROUND OF THE INVENTION

1. Field of the Invention

The present invention relates generally to electric lamps and more particularly to electric lamps that use fossil or hydrocarbon fuels to heat volatile substances so they may be dispensed.

2. Description of the Related Art

Many people utilize portable devices to heat volatile substances such as mosquito repellents as part of camping gear or for various outdoor activities where there exists a threat of mosquitoes. Such volatile substances most commonly are either insect control active ingredients or air treatment materials, such as air fresheners. The mosquito repellent systems are manyfold, and for camping or special uses, it is desirous that the mosquito repellent system be portable.

An example of a prior art mosquito repellent system is that of U.S. Pat. No. 5,928,605, assigned to the instant assignee. In that device, a butane cartridge supplies fuel to uniformly heat a thermally conductive plate upon which a mat containing volatile insect repellent is positioned. When the plate is sufficiently heated, the insect repellent is volatilized and thereby dispensed. The evaporation of the insecticide and its dispersion causes mosquitoes to be repelled for a reasonable space around the portable mosquito repellent device.

Another prior art product is that identified as OFF sold by SC Johnson (U.S. Pat. No. 6,663,838 and others). In that device, a candle is provided that heats a mat placed in a vertical position atop thereto. The heat from the lighted candle causes insecticide in the mat to evaporate therefrom and be dispersed.

Both prior art devices lack versatility and have limitations. In particular, the prior Thermacell product does not have a light available to illuminate an area, whereas the OFF product has a flame which acts both as a source of light to illuminate an area and as a source of heat to volatilize a substance to be dispensed. The small flame required to volatilize the volatile substance is not very luminous and its intensity cannot be controlled. Moreover, a user cannot turn off the light source without terminating the dispersal of insect repellent.

U.S. Pat. No. 6,033,212, assigned to the instant assignee, discloses a lamp which both provides light and also dispenses a volatile substance. The light is produced by burning a hydrocarbon fuel, with the excess heat being harnessed to heat a thermally conductive plate upon which a mat containing the repellant is placed However, this device similarly suffers from a poor quality light and does allow a user to turn off the light source without terminating the dispersal of insect repellent.

SUMMARY OF THE INVENTION

The present invention addresses these limitations by providing a device to dispense a volatile substance, which has an independent light source whereby the light source and the dispersal of a volatilizable substance are each individually controllable. A thermally conductive heating plate upon which a mat impregnated with a volatilizable substance is placed dispenses the mosquito repellent, and one or more light bulbs or LEDs, which are powered by a portable battery, are provided for emitting light. The light that is generated by the LEDs is consistent, and its brightness can be adjusted according to a user's preference. The lamp provides bright light when desired, and in contrast with the prior art SC Johnson device, there is no open flame, no match and no lighter needed to operate the device.

The lantern may be utilized solely as a lantern without the operation of the mosquito repellent system, or the mosquito repellent system can operate without the use of the separate lighting system. In some cases, one or other will be desired and yet in other cases both mosquito repellent and suitable local light will be desired.

The insect repellent is dispensed in accordance with the teachings of U.S. Pat. Nos. 6,033,212, 5,928,605 and 5,944,508 all of which are incorporated by reference herein. Those patents all teach the use of a portable source of fuel for sustaining a flame, the heat from which is directed to a thermally conductive plate, which is in contact with a mat containing a volatilizable insecticide. When the plate is sufficiently heated, the insecticide is volatilized and thereby dispensed.

An object of this invention is to provide an improved combination portable lantern and mosquito repellent system.

Yet another object of this invention is to provide a portable device in which each of a lantern and a mosquito repellent system is operated independently of one another.

Yet another object of this invention is to provide the ability to control the amount of light in the lantern/repellent combination device.

Yet another object of this invention provides a lightweight, simple to use, and effective combination lantern and mosquito repellent device suitable for widespread outdoor use.

It is still another object of the invention to provide a portable lantern, which dispenses volatilizable substances such as, for example, aromatic substances.

Other objects, advantages and features of this invention will become more apparent from the following description.

DETAILED DESCRIPTION OF THE INVENTION

Embodiments of the present invention will now be described with reference to the above-identified Drawings. However, the Drawings and the description herein of the invention are not intended to limit the scope of the invention. It will be understood that various modifications of the present description of the invention are possible without departing from the spirit of the invention. Also, features described herein may be omitted, additional features may be included, and/or features described herein may be combined in a manner different from the specific combinations recited herein, all without departing from the spirit of the invention As mentioned, insect repellent is volatilized and dispensed according to the teachings of the US patents incorporated by reference herein Below, however, is a description of how those teachings may be incorporated into the present invention. Although the current application describes volatilizing insecticide, it will be understood that any volatilizable substance may be dispensed according to the teachings herein.

Figure 1:
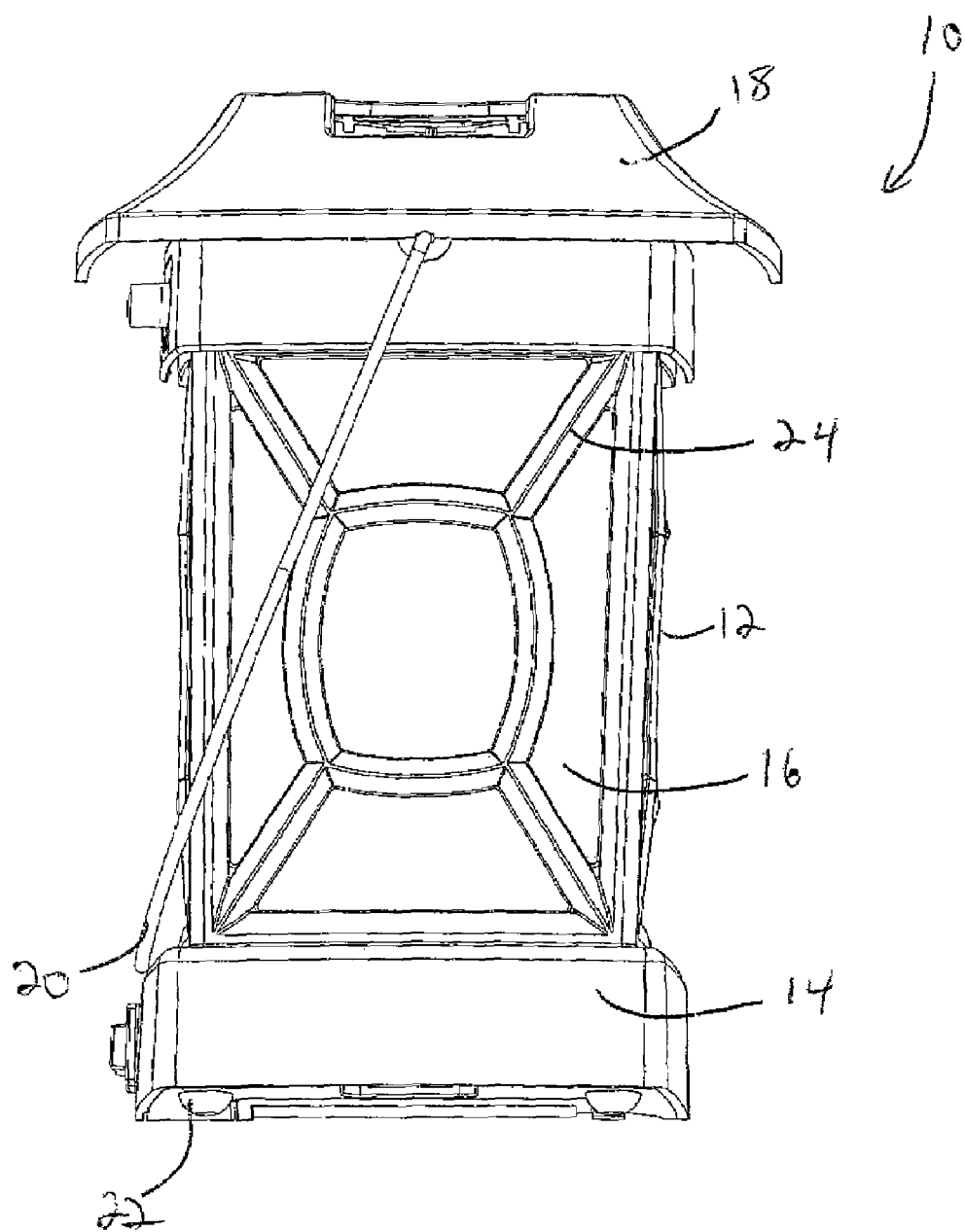
FIG. 1 is a perspective, side view of a lantern according to an embodiment of the invention.

Referring to FIG. 1, the housing 12 of lantern 10 includes a base 14, a globe 16 and a roof portion 18 disposed atop thereto. A pivoting handle 20 is also provided for the ease of handling or hanging the lantern 10. The bottom surface of base 14 is substantially flat, and preferably comprises small appendages or legs 22 to increase the stability of the unit when it is set down on a table or the like.

Globe 16 is comprised of a translucent or transparent material, such as glass, plastic, Pyrex or any similar substance through which light emitted from LEDs may be radiated. Preferably, globe 16 extends from roof 18 and inserts into a tight-fitting, decorative cage structure 24. In a preferred embodiment, the cage structure 24 is made of a durable plastic or metallic material and is attached to base 14. Thus, because globe 16 is attached to roof portion 18 globe 16 may be withdrawn from cage structure 24 by removing roof 18. As will be described in further detail below, withdrawing the roof/globe from cage structure 24 will provide a user with access to a fuel cartridge that is disposed in the housing 12 of the lantern 10.

Figure 2:
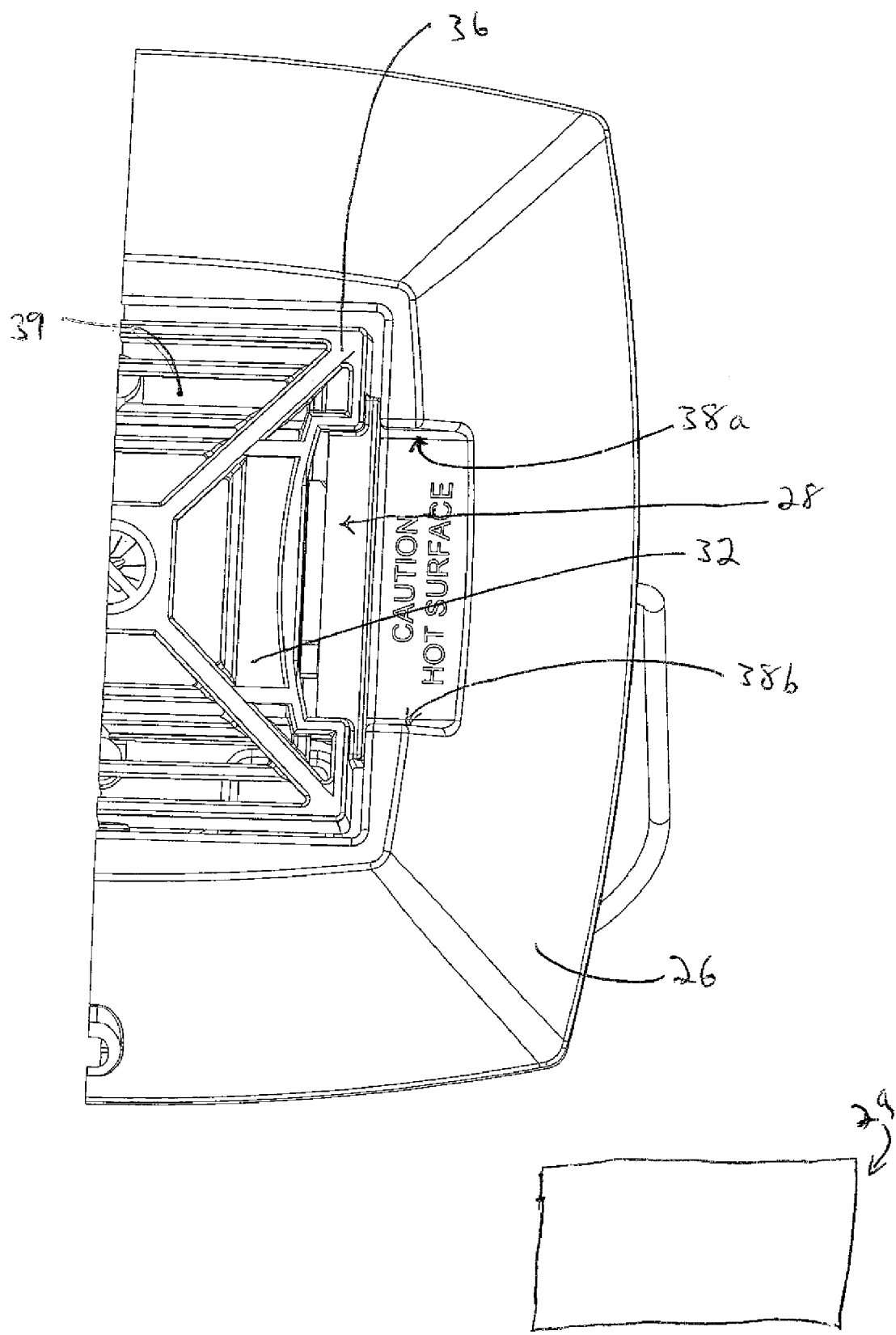
FIG. 2 is a top perspective view of a cross section of the roof portion of a lantern according to an embodiment of the invention.
Figure 3:
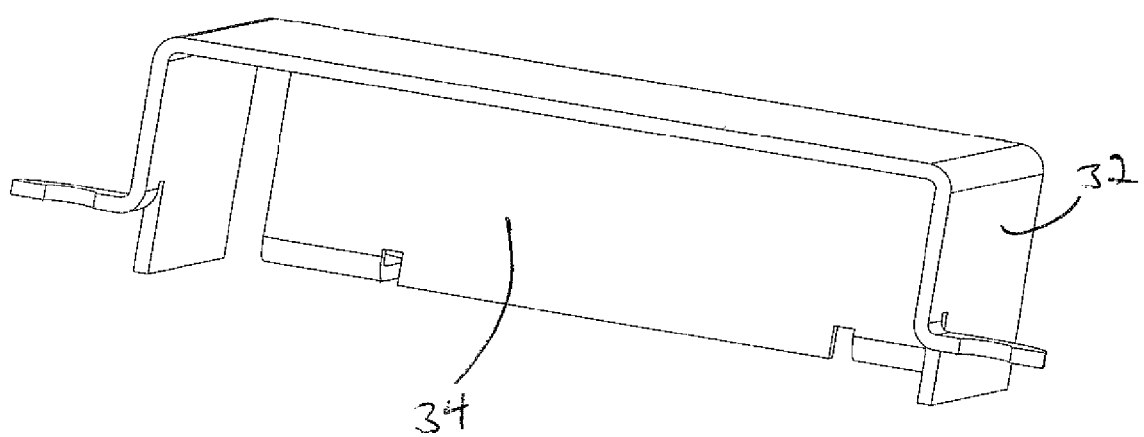
FIG. 3 is a perspective, cross sectional view of a heating plate according to an embodiment of the invention.

As shown in FIG. 2 the top surface 26 of roof 18 is provided with a slot 28 for inserting a mat 29. Slot 28 is defined by at least a bottom surface 32, an upper surface 36 and two side surfaces 28a 28b. Preferably, the floor of the slot comprises a thermally conductive heating plate 32, such that when the mat 29 is inserted into slot 28, it is in physical thermal contact with heating plate 32. FIG. 3 shows an enlarged cross section of the heating plate 32. A heat source disposed below 34 heating plate 32 supplies sufficient heat, such that volatilizable insect repellent on a mat 29 that is placed on surface 35 is volatized and dispensed. It will be understood by those of ordinary skill in the art that the mat need not be placed directly on heating plate 32, rather it need only to be positioned within a close enough proximity to the flame to be sufficiently heated therefrom. Moreover, it will be understood by those of ordinary skill in the art that the mat 29 may be heated directly from a flame or other heat source without necessitating a heat plate for thermally receiving and releasing heat It will be understood by those of ordinary skill in the art that sufficient heat may obtained via a variety of heat sources—all of which are within the scope of the current invention. For example, as described in U.S. Pat. No. 5,928,605—the contents of which are incorporated by reference herein—a heat plate is heated by the flameless combustion of fuel on the surface of a catalytic structure. Such a catalytic system may be used in an embodiment of the current invention.

Figure 8:
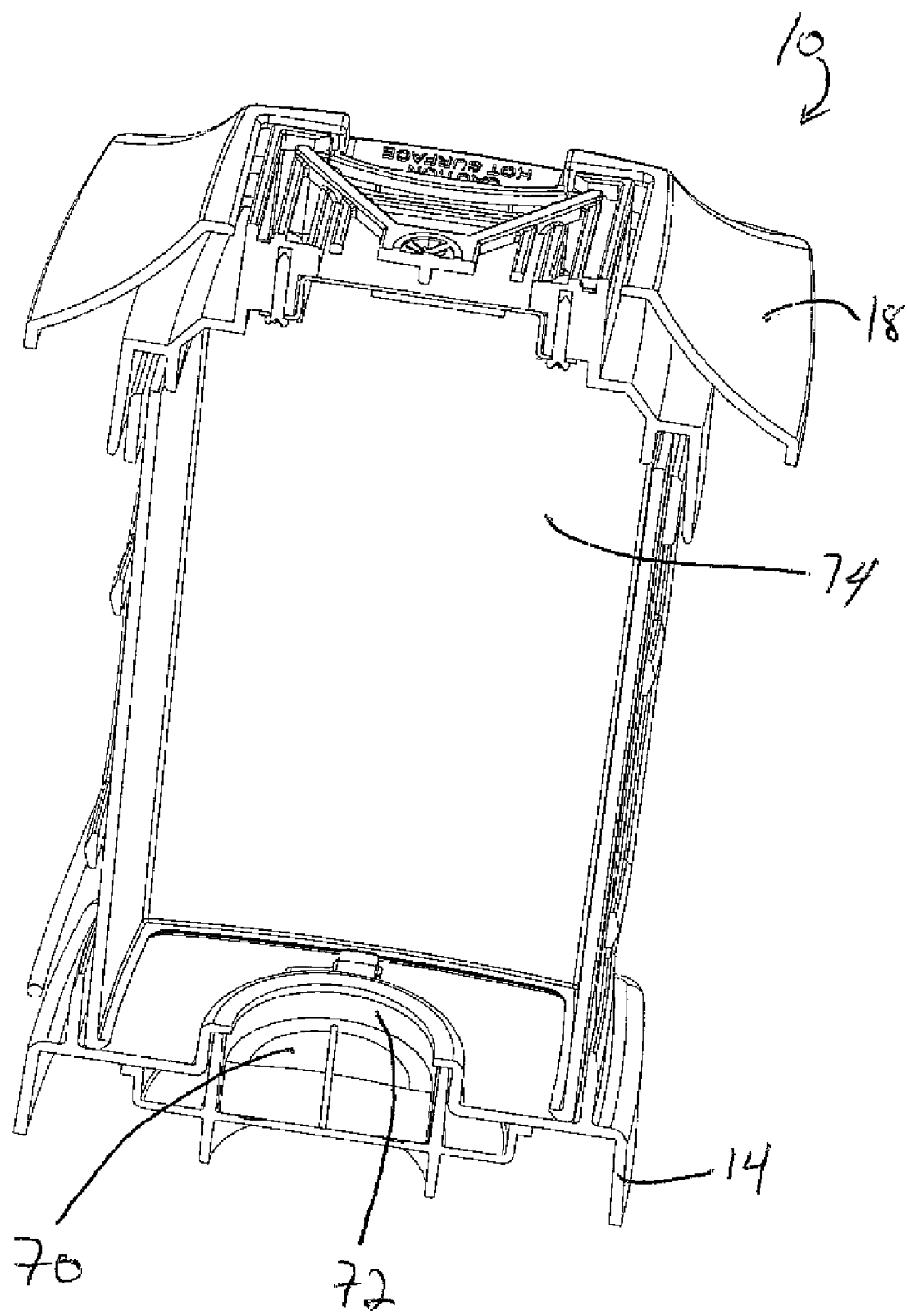
FIG. 8 is a perspective cross-sectional view of a lantern having a base with a groove for receiving a candle therein according to an embodiment of the invention.

Alternatively, a heating plate or a mat may be heated from the flame of a candle burning therebelow. Referring to FIG. 8, a lantern is shown having a groove 70 in base 14. The groove comprises raised walls 72 having a circumference roughly sized to accommodate a candle or tea-light. It will be understood that a groove or a similar candle-supporting member may be positioned in any of various locations in the housing 12 of a lantern. For example a candle-supporting member may be positioned if the upper portion 74 of the housing and is as such in close proximity to a heating plate or a mat. The candle can be used for heating a volatizible substance simultaneously with or independently of the electric light source and vice versa.

Figure 4:
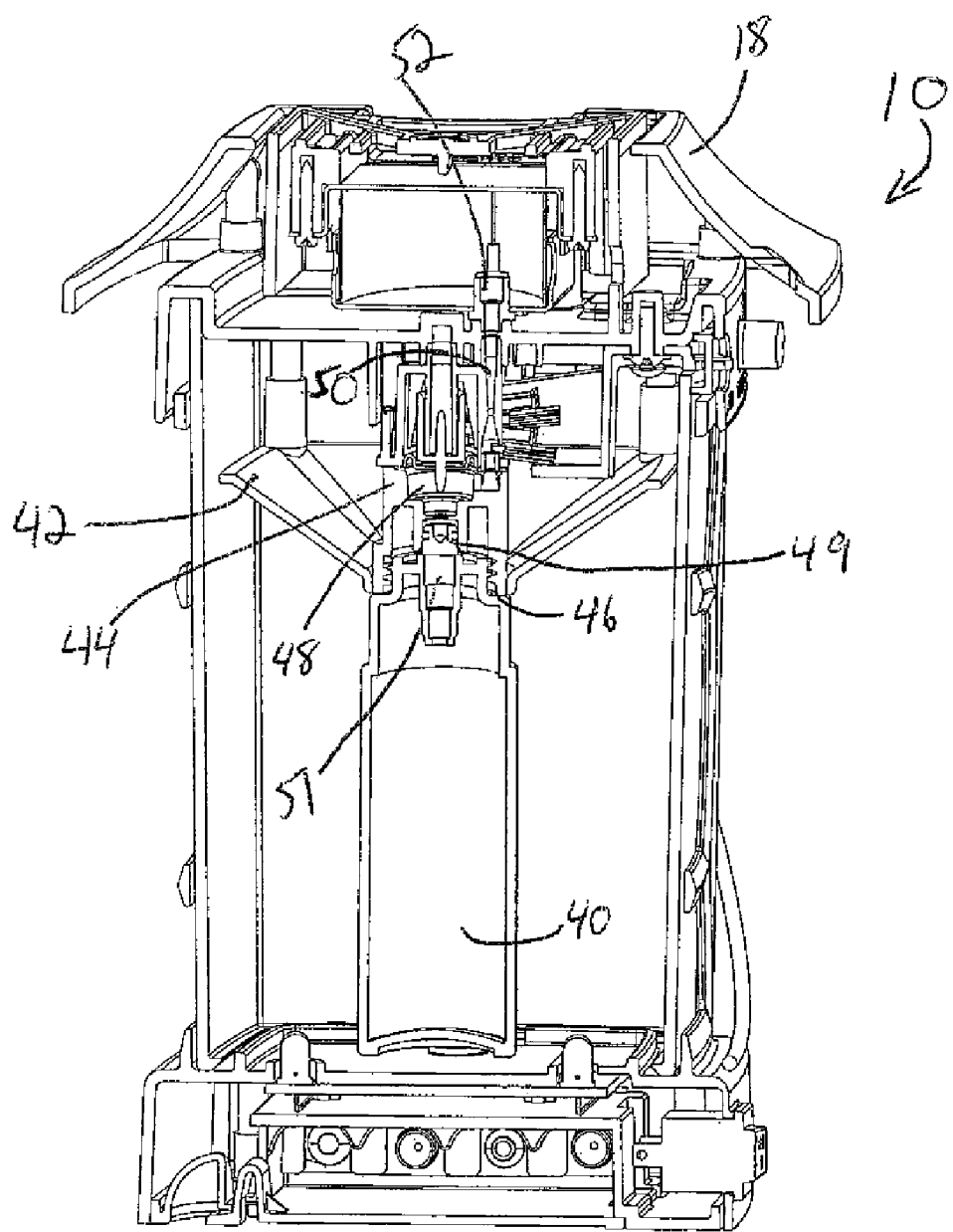
FIG. 4 is a perspective, cross sectional view of a lantern according to an embodiment of the invention.

Referring to FIG. 2, the top surface of slot 28 comprises a grill 36, which protects mat 29 when inserted into slot 28, while allowing for volatilized substances to escape through a plurality of vents 39. Side surfaces 38a, 38b are spaced apart to roughly accommodate the width of a mat and such present a physical barrier for the lateral movement thereof FIG. 4 is a vertical cross section of the lantern 10 showing a vertically oriented fuel cartridge 40 in a cavity defined by housing 12. Fuel cartridge 40 is preferably filled with a gaseous or liquid hydrocarbon fuel such as butane or propane. Fixed to roof portion 18, for instance, by way of lateral support members 42 is a fuel tank connection assembly 44. In a preferred embodiment, connection assembly 44 is provided with threads 46 for threadably coupling a threaded fuel cartridge therewith. When fuel cartridge 40 is inserted into assembly 44, a valve activator 49 depresses the fuel cartridge valve 51 releasing gas therefrom. A flow control device such as a pressure regulator 48, is positioned in connection assembly 44 at the site at which the cartridge valve 51 contacts connection assembly 44. Control device 48 is in fluid communication with cartridge 40 and regulates the flow of fuel therefrom.

In an embodiment of the invention, instead of a removable cartridge, a refillable reservoir for storing hydrocarbon fuel is disposed inside of the housing 12 of the lantern. The reservoir may be permanently or removeably fixed inside therein.

Fuel flowing through control device 48 is directed into a venturi tube 50, which has an opening for the inflow of air thereby allowing for a fuel/air mixture which is necessary for combustion.

Figure 5:
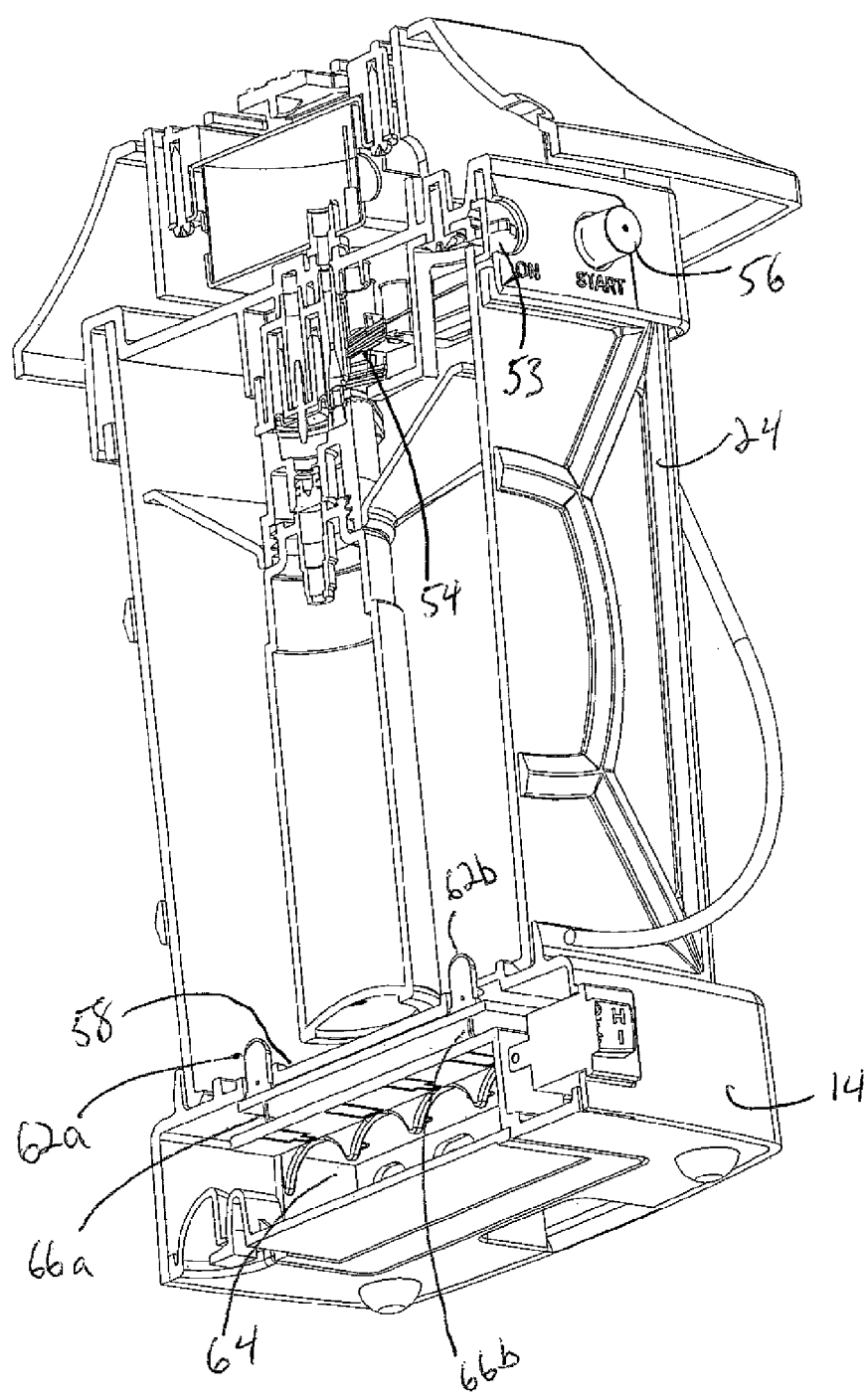
FIG. 5 is an enlarged perspective cross-sectional view of a lantern according to an embodiment of the invention.
Figure 6:
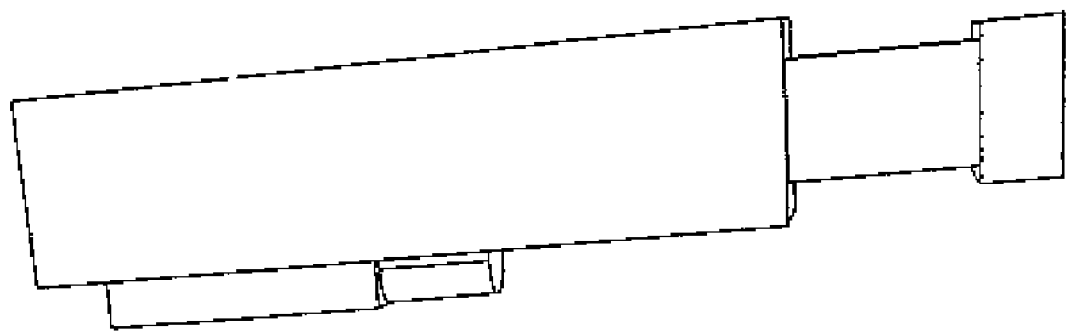
FIG. 6 shows a perspective side view of a piezoelectric device that may be used in an embodiment of the invention.

In use, the fuel is accelerated by the venturi tube 50 into a combustion nozzle 52 at which point a spark is supplied to ignite the fuel/air mixture. For example, as shown in FIG. 5 an On/Off switch is provided which comprises a lever 54 extending from a button (button is not shown, but is positioned inside of recess 53). When the button is switched to the On position, lever 54, allows for the flow of fuel to combustion nozzle 52. Once the fuel/air mixture is in the combustion nozzle, a user presses the Start button 56, which activates a spark to ignite the fuel In a preferred embodiment, a piezoelectric device (as shown in FIG. 6) is positioned to be in communication with button 56, and is activated by mechanical stress exerted thereon.

To replace cartridge 40, a user will remove roof section 18, thereby withdrawing globe 16 from cage structure 24 to expose cartridge 40, which is secured to connection assembly 44. Cartridge 40 is secured such that it is selectively removable from assembly 44, for example by way of a threaded connection, snap, bayonet or by similar means which are well known in the art. Preferably, globe 16 is secured to base 14 by way of biasing clips.

Figure 7:
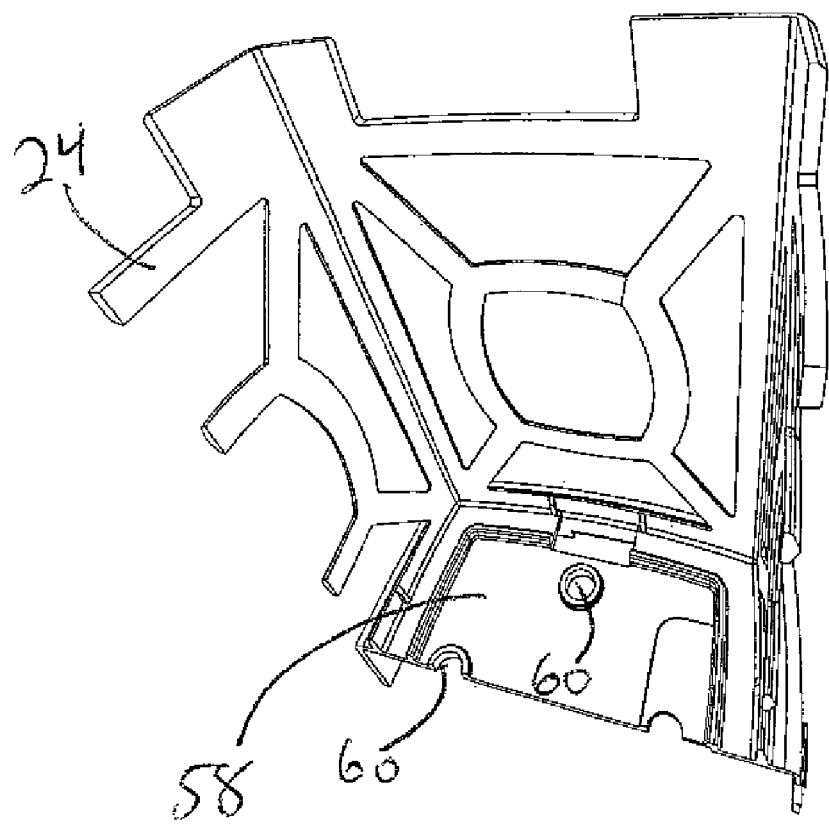
FIG. 7 is a partial exploded view of the floor surface of the base of the lantern in one embodiment of the invention.
Figure 9:
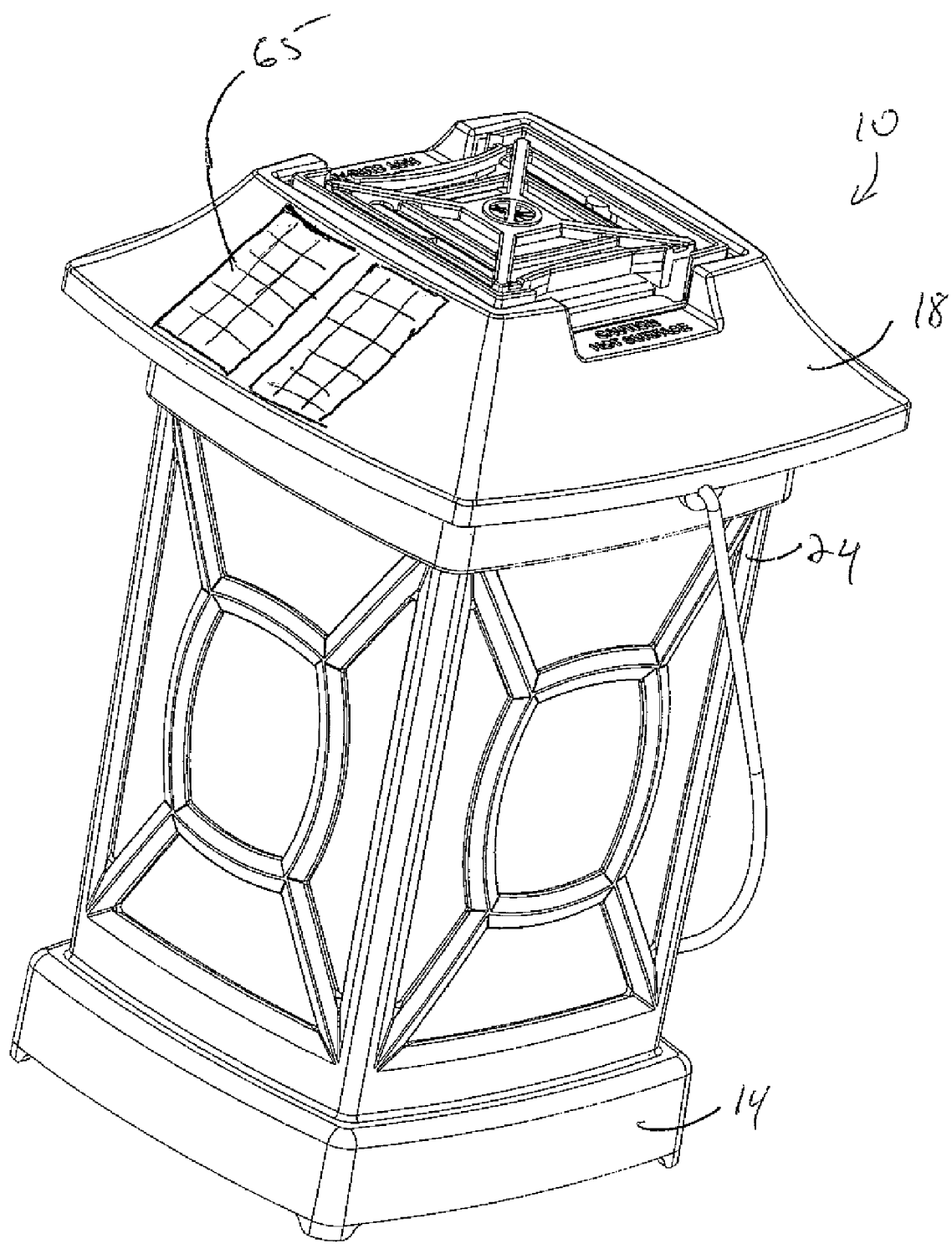
FIG. 9 is a perspective side view of a lantern having solar panels on its upper surface.

The inside surface 58 of base 14 comprises a plurality of holes or openings 60 (as best seen in FIG. 7). As shown in FIG. 5, LEDs 62a, 62b or other light emitting devices are inserted through openings 60. A battery box 64 is disposed inside of base 14 for holding batteries used for powering the LEDs. Any of a variety of battery types known to one of skill in the art may be utilized. For example, removable disposable batteries, removable re-chargeable batteries or fixed rechargeable batteries all are possible sources of electrical current to supply a light source in accordance with embodiments of the invention. In one embodiment, as shown in FIG. 9, the lantern is provided with one or more solar panels 65 or solar collectors for absorbing solar radiation. Such stored energy is converted into electrical energy, which used to charge a rechargeable battery disposed inside the lantern As shown, electrical wires 66a, 66b deliver an electrical current to the LEDs from batteries (not shown) located in battery box 64. Note that a battery box may be located in any of various locations within housing 12, such as for example in roof portion 18 (not shown).

It will be understood by those of ordinary skill in the art that instead of a plurality of light bulbs or LEDs, a singular light bulb or LED may be utilized.

In use, a user activates the LEDs by moving a switch 66 into an On position in order to initiate the flow of electricity. In one embodiment, switch 66 is wired such that there are more than two possible configurations. In one configuration, (e.g. for a "High" setting) all of the LEDs are activated whereas in another configuration (e.g. for a "Low" setting) fewer than all of the LEDs are activated.

In another embodiment, all of the LEDs or bulbs are activated when the switch is turned on, except that the intensity of the light is controlled by a dimmer or the like which is well know in the art for varying the current flow to a light bulb.

It will be understood by those of ordinary skill in the art that a single, or plurality light sources may be positioned in any of various locations within the housing 12 of the lantern 10. For example, in one embodiment, the lantern 10 may be provided with a vertical member having a plurality of LEDs affixed to it, which extends from base 14 and spans the length of globe 16 (i.e. running substantially parallel to fuel cartridge 40). Alternatively, a long, slender light bulb (such as, for example, a fluorescent bulb) may be provided which extends vertically from base 14, and spans the length of globe 16 or a portion thereof.

It will be further understood that any artificial light source that is powered by an electric current, such as fluorescent/incandescent bulbs or LEDs may be used in connection with this invention.

Having described this invention with regard to specific embodiments, it is to be understood that the description is not meant as a limitation since further modifications and variations may be apparent or may suggest themselves to those skilled in the art. It is intended that the present application cover all such modifications and variation as fail within the scope of the appended claims.

We claim:

1. A portable apparatus for dispensing a volatilizable substance and for supplying light comprising:
   a lantern comprising a housing said housing comprising at least a base a globe and a roof portion;
   an assembly disposed in said housing for receiving a fuel cartridge;
   a tube for delivering fuel from said fuel cartridge to a combustion nozzle;
   a spark source for igniting a fuel/air mixture for a combustion at said combustion nozzle, said combustion comprising a heat source for volatilizing said volatilizable substance;
   a heating plate disposed above said heat source;
   a mat having a volatilizable substance disposed above said heating plate, said volatilizable substance being volatilized by heat produced from said combustion at said heat source;
   said lantern further comprising at least a light source, said light source being powered by electricity;
   whereby said light source and said heat source are controllable independently of each other.

2. The apparatus of claim 1, wherein said light source comprises at least an LED.

3. The apparatus of claim 1, wherein said light source comprises at least an incandescent light bulb.

4. The apparatus of claim 1, wherein said light source comprises at least a fluorescent light bulb.

5. The apparatus of claim 1, wherein said electricity to power said light source is generated by a battery.

6. The apparatus of claim 1, wherein said electricity to power said light source is generated by a rechargeable battery.

7. The apparatus of claim 6 wherein said rechargeable battery is recharged by solar energy.

8. The apparatus of claim 1, further comprising a dimmer, said dimmer controlling the current flow to said light source.

9. The apparatus of claim 1, wherein the electric light is controlled by a switch.

10. The apparatus of claim 1, wherein said fuel cartridge is selectively removable from said lantern.

11. The apparatus of claim 1, wherein said fuel cartridge contains butane.

12. The apparatus of claim 1, wherein said fuel cartridge contains propane.

13. The apparatus of claim 1, wherein hydrocarbon fuel is supplied from a re-fillable reservoir that is permanently or removeably affixed to said apparatus.

14. The apparatus of claim 1, wherein said combustion nozzle supports a flame.

15. The apparatus of claim 1, wherein said heat source comprises combustion of fuel on the surface of a catalytic structure.

* * * * *